Patented Aug. 5, 1952

2,606,319

UNITED STATES PATENT OFFICE 2,606,319

RADIO ANGLE RECEPTION METER

Joseph T. de Bettencourt, Chestnut Hill, Mass., assignor to Raytheon Manufacturing Company, Newton, Mass., a corporation of Delaware Application May 23, 1950, Serial No. 163,745

6 Claims. (Cl. 343—113)

This invention relates to measurement of the angle of arrival of pulsed radio energy transmissions.

The measurement of the angle of arrival of radio energy waves is of importance particularly in the study of wave propagation. For example, radio energy from a transmitter at the surface of the earth may reach a receiver at a selected point by several possible paths or modes of propagation some of which, particularly in the case of very long distances between transmitter and receiver, are due to reflections from the E and F layers of the ionosphere. These reflections, in arriving at a receiver near the ground, are directed downwardly, and are hereinafter termed down-coming radio waves as distinguished from reflections of these down-coming waves from the earth's surface arriving at the receiver and hereinafter termed reflected waves. In the study of these various angular paths of arrival from the ionosphere and the earth's reflections, it becomes desirable to isolate selected modes of propagation at the receiver. Such isolation makes possible a clear indication of the angle of arrival due to the selected mode and assists in a better understanding of the propagation of radio waves.

Pursuant to the present invention, isolation in a radio energy receiver to a single mode of propagation or to a selected group of modes of propagation may be obtained and angle of arrival readings of the down-coming radio waves of such selected mode of propagation may be accurately and rapidly made.

In the present invention radio energy pulses are emitted from a transmitter at suitable intervals. The receiver which is tuned to receive the energy of these pulses incorporates a gating arrangement synchronized with the pulses from the transmitter and controllable as to the time in which the gating period begins with respect to the emitted pulses and as to the duration of the gating period. A transmitted pulse will appear at the receiver as a train of pulses due to the variation in travel time determined by the various modes of propagation. Thus by the above gating arrangement a particular arrival pulse or group of pulses in the train is isolated from the other arrival pulses in the train. The modes of propagation of these isolated arrival pulses are thereby isolated in the receiver for purposes of study.

Such a gating arrangement, however, of itself is not sufficient to satisfactorily isolate a mode of propagation. During the selected arrival pulse in addition to the down-coming radio waves, the above-mentioned reflections from the earth's surface also occur at the receiver. It is, therefore, necessary to provide an arrangement whereby the angle of arrival of the down-coming waves may be determined despite these ground reflections. For this purpose, a triple antenna array, to be hereinafter more fully described, is used. The combination of the above-mentioned gating arrangement with the triple antenna array thereby makes possible obtaining information in the receiver for measuring the angle of arrival of down-coming radio waves of a selected mode of propagation.

Such angular information is obtained in the receiver generally as follows. The three antennas in the array are arranged horizontally in a plane perpendicular to the ground and with the two outer antennas in one circuit and the middle antenna in a second circuit. Voltage signals induced in the antennas by the propagated radio waves appear in the two antenna circuits and are applied to adding and subtracting preamplifier circuits. These added and subtracted voltage signals are each sent to a superheterodyne receiver having a common heterodyning oscillator where they are suitably amplified. The rectified output signals from the superheterodyne receivers are each sent to a gated peak reading rectifier circuit. The gating of the peak reading rectifier circuits is achieved by two monostable multivibrators, one arranged to set the starting position of the gate and the other arranged to set the width of the gate. A trigger generator producing pulses in synchronism with the pulses of the transmitter is coupled to the gate positioning multivibrator. The signals from the two peaking circuits are then compared in an electronic comparison or ratio circuit. The resulting comparison is then continuously registered on an electronic strip chart recorder for ready reference in determining the angle of arrival of the radio waves of the selected mode of propagation.

The above and other features, objects and advantages of the invention will become more apparent from the following description taken in connection with the accompanying drawings, wherein.

Figure 3:
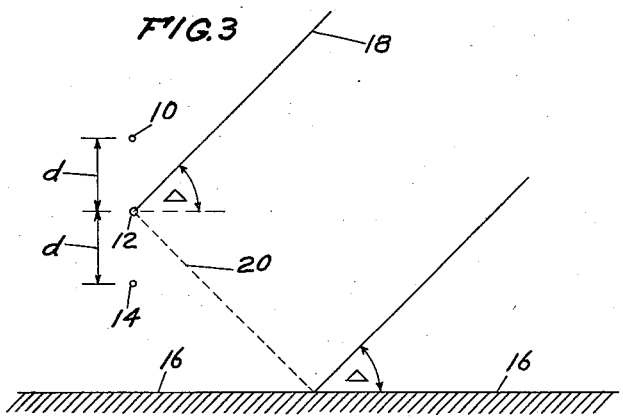
Fig. 3 is a diagrammatic view of a triple antenna array showing down-coming and reflected waves for aid in illustrating the operation of the invention.

Referring to Fig. 3 first, 10, 12 and 14 are the end views of three antennas arranged horizontally in a parallel array above the surface of the earth 16 in a plane perpendicular to the earth's surface 16. The antennas 10, 12 and 14 are spaced apart by a distance $d$. An array of three antennas so arranged has desirable characteristics in the measurement of the angle of arrival $\Delta$ of a down-coming radio wave 18 regardless of the simultaneous existence of a radio wave 20 reflected from the surface of the earth 16. Designating a horizontal component of the down-coming radio wave 18 at the antenna 12 by $e_d$ and that of the reflected wave 20 at the antenna 12 by $e_R$ the instantaneous values of $e_d$ and $e_R$ may be be expressed $$e_d = E_d \cos \psi\, t$$
$$e_R = E_R \cos (\psi t - b) = E_R \cos \psi\, t'$$

in which $E_d$ and $E_R$ are the maximum amplitudes of horizontal components of the electric fields (at antenna 12) of the down-coming and reflected waves, $\psi$ is the angular frequency of the waves, $t$ the time and $b$ is the phase difference between the two horizontal components arriving at antenna 12.

Assuming the plane of incidence of the wave 18 is perpendicular to the plane of the antennas then the instantaneous values of the horizontal components of the total fields at antennas 10, 12 and 14 are $$e_{10} = E_d \cos (\varphi t + \phi) + E_R \cos (\varphi t' - \phi)$$
$$e_{12} = E_d \cos \varphi t + E_R \cos \varphi t'$$
$$e_{14} = E_d \cos (\varphi t - \phi) + E_R \cos (\varphi t' + \phi)$$

in which $\phi$ is determined from Fig. 3 as $$\phi = \frac{2\pi d}{\lambda} \sin \Delta$$

where $d$ and $\gamma$ (the wave length of the radio wave) are measured in the same units.

By connecting antennas 10 and 14 the combined voltage induced in them produces a voltage given by $$V_1 = K_1(e_{10} + e_{14}) =$$
$$K_1[2E_d \cos \varphi t \cos \phi + 2E_R \cos \varphi t' \cos \phi] =$$
$$2K_1(e_d + e_R) \cos \phi$$

The field at antenna 12 produces a voltage given by $$V_2 = K_2 e_{12} = K_2(e_d + e_R)$$

In the above equations the constants $K_1$ and $K_2$ are system constants depending upon the antenna size, spacing $d$, height above the earth's surface 16 and the constants of transmission line and coupling to suitable utilizing circuits such as will hereinafter be described with respect to Fig. 1.

Figure 1:
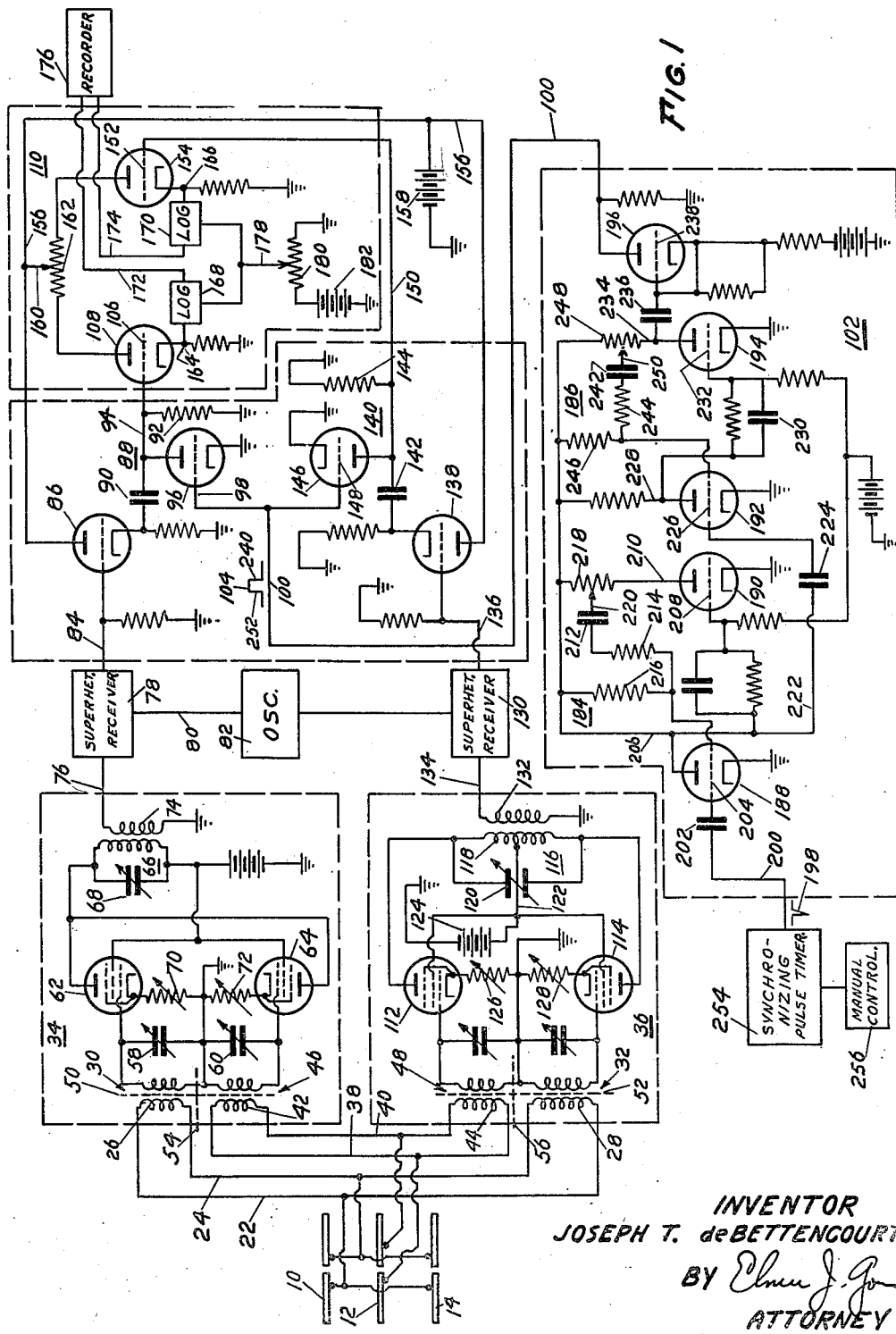
Fig. 1 is a partially schematic and partially block diagram of a suitable gated receiving apparatus for use in the invention.

In the embodiment in Fig. 1, the voltages $V_1$ and $V_2$ are first operated on by "adder" and "subtractor" circuits. $V_1$ and $V_2$ are added by an in-phase circuit to give a voltage $$V' = K_3(V_2 + V_1)$$

Also, $V_1$ and $V_2$ are subtracted by an anti-phase circuit to give a voltage $$V'' = K_3(V_2 - V_1)$$

The effective voltages $V'$ and $V''$ form a ratio $$R = \frac{V''}{V'}$$

which is measurable. From the above equations, the ratio $R$ may be expressed $$R = \frac{V_2 - V_1}{V_2 + V_1} = \frac{(e_d + e_R)(K_2 - 2K_1 \cos \phi)}{(e_d - e_R)(K_2 + 2K_1 \cos \phi)} = \frac{K_2 - 2K_1 \cos \phi}{K_2 + 2K_1 \cos \phi}$$

Figure 4:
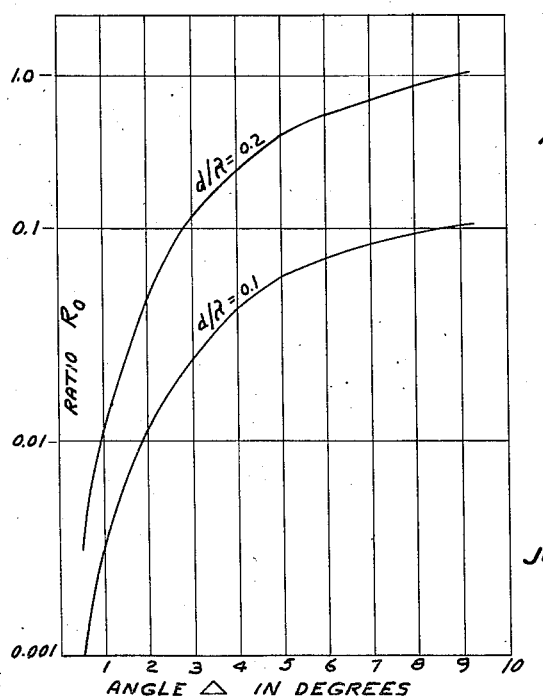
Fig. 4 is a typical graph for determining the angle of the arrival from measured voltage ratios in the embodiment in Fig. 1.

In the embodiment in Fig. 1, adjustment is made so that $K_2 = 2K_1$ for which condition the ratio $R$ becomes $$R_0 = \frac{1 - \cos \phi}{1 + \cos \phi} = \tan^2 \frac{\phi}{2}$$

and the ratio $R_0$ is then measured. From this measurement of $R_0$ and the theoretical discussions above, suitable charts may be arranged for directly finding $\phi$ and the angle $\Delta$, the angle of arrival of the down-coming radio waves. One such exemplary chart is shown in Fig. 4.

It is noted that for a given value of $$\frac{d}{\lambda}$$

$R_0$ increases with the angle $\Delta$. Also, the accuracy is greater for lower angles of arrival. The low angles of arrival are generally of greatest interest in applications to long distance transmission.

The above analysis of a single mode of propagation may also be extended to multiple modes of propagation. Because of the gating arrangement for isolating a mode of propagation in the embodiment in Fig. 1, this analysis is directly applicable there.

Referring now to Fig. 1, antennas 10, 12 and 14, in this instance dipoles, are arranged as explained with regard to Fig. 3. The outer antennas 10 and 14 are connected by lines 22 and 24, respectively, across primaries 26 and 28 of radio frequency transformers 30 and 32 in the voltage adding circuit 34 and voltage subtracting circuit 36, respectively. The antenna 12 is connected through lines 38 and 40 across the primaries 42 and 44 of radio frequency transformers 46 and 48, also in the voltage adding and subtracting circuits 34 and 36, respectively. The radio frequency transformers 30 and 32, 46 and 48 are preferably provided with electrostatic shields 50 and 52 between primaries and secondaries and suitable inductive electrostatic shields 54 and 56 between transformers 30 and 46, and 32 and 48, respectively. In the voltage adding circuit 34 variable capacitances 58 and 60 are connected across the secondaries of transformers 30 and 46, respectively, to provide resonant circuits tuned to the radio frequency of the received signal pulses. These tuned circuits provide the input to the control grids of amplifier tubes 62 and 64, respectively, which may be of the 6SK7 type. The amplifier tubes 62 and 64 are connected in parallel across an inductive capacitive tank circuit 66 tuned by means of a variable condenser 68 to the input signal frequency. The gain of tubes 62 and 64 is controlled by variable resistances 70 and 72, respectively, and provides the $K_1$ and $K_2$ adjustments hereinbefore mentioned. Roughly, the adjustments of resistances 70 and 72 for making $K_1 = 2K_2$ are approximately at a point where the gain of tube 64 is twice that of tube 62. Accurate adjustment may be made by initially adjusting to a controlled input signal of known value.

The voltage signals induced in antennas 10 and 14 and antenna 12 appear through transformers 30 and 46 and are amplified by tubes 62 and 64, respectively, and the added composite of the two voltages will appear across the resonant circuit 66. The inductance coil of the resonant circuit 66 is coupled to a secondary coil 74 by means of which the added voltage signals are made to appear through line 76 at a suitable superheterodyne receiver 78 whose heterodyning frequency is obtained through line 80 from an oscillator 82. The superheterodyne receiver 78 is of conventional type suitable for amplifying pulsed signals of the particular frequency used. The detected output of the receiver 78 appears through line 84 and is amplified by an amplifier tube 86, to raise the receiver output signal in line 84 to an output level convenient for a gated peak reading rectifier circuit 88. The peak reading rectifier circuit 88 has a capacitor 90 having one side connected to the cathode of the amplifier tube 86, and a grounded resistance 92 connected through line 94 to the other side of capacitance 90. A triode 96 has its anode connected to line 94 between capacitance 90 and resistance 92 and its cathode connected to ground. Grid 98 of triode 96 is connected to a line 100 leading from a gating circuit 102, to be hereinafter described, which produces a positive gating pulse 104 synchronized with the radio energy pulses of the transmitter. Since the triode 96 may become conductive only during the occurrence of the gating pulse 104, the capacitor 90 will charge to the peak voltage determined by the signal level in line 84 and the amplifier tube 86 only during this desired gating period. At the termination of the gating pulse 104, the capacitor 90 will immediately begin to discharge through resistance 92 which is chosen at such a value so as to produce a long time constant (12 seconds in the present embodiment) compared to the repetitive period of the gating pulses 104 (.05 second in this instance). The peak voltage in the peaking circuit 88 will therefore continuously appear through line 94 at grid 106 of triode 108 in the comparison or ratio meter circuit 110.

The voltage subtracting circuit 36 is similar to the adding circuit 34, except for the parallel connection of the preamplifier tubes across the output tank circuit. Amplifier tubes 112 and 114 in the voltage subtracting circuit 36 are connected in push-pull across a tank circuit 116 consisting of an inductance 118 and a split stator type variable condenser 120 having the third plate 122 connected to the midpoint of the inductance 118 and the source of positive potential 124, such as a battery. Variable resistances 126 and 128 control the gain of amplifier tubes 112 and 114, respectively, and provide the setting for $K_1$ and $K_2$ as explained above.

A superheterodyne receiver 130, which may be similar to the receiver 78 and receiving its heterodyning frequency from oscillator 82, is coupled to the inductance coil 118 of the tank circuit 116 by an inductance coil 132. Thus the preamplified voltage difference signal from the voltage subtracting circuit 36 appears through line 134 at the receiver 130 where it is suitably amplified and detected. The amplified and detected voltage signal appears in the output line 136 and is further amplified to a suitable level by an amplifier tube 138 for a voltage peaking circuit 140. Amplifier tube 138 may be similar to amplifier tube 86, and the voltage peaking circuit 140 may be similar to the voltage peaking circuit 88, and similarly having a long discharge time constant capacitor 142 and resistance 144, and a triode 146 with a grid 148 controlled by gating pulse 104 for gating the peaking circuit 140 similarly to the gating in peaking circuit 88. Thus the peak voltage determined by the signal in the output line 136 and amplifier tube 138 will appear through line 150 at grid 152 of triode 154 in the comparator or ratio circuit 110.

The comparator or ratio circuit 110 has two triodes 108 and 154 connected in parallel from the positive potential line 156 to ground. The potential across triodes 108 and 154, due to the positive potential in line 156 from a potential source, such as battery 158, and the normal biasing potential from lines 94 and 150 at grids 106 and 152 is such that the triodes 108 and 154 are normally conductive. Adjusting arm 160 is set at a position on resistance 162 in the anode circuit of triodes 108 and 154 so that the potential at points 164 and 166 at the cathodes is the same when grids 106 and 152 are at ground potential. The points 164 and 166 are connected through non-linear resistance networks 168 and 170 and lines 172 and 174, respectively, to a ratio voltage recorder 176. The resistance networks 168 and 170 have preferably voltage outputs proportional to the logarithm of the input. A suitable resistance network of this type is commercially known as "Logatens" and may be obtained commercially from the Kalbfell Laboratories, San Diego, California. It should be understood here that other logarithmic networks, such for example as employing logarithmic diodes or variable transconductance tubes, may also be used. The voltages in line 172 and 174 are initially balanced for no signal voltage condition by suitable setting of adjusting arm 178 on a reference voltage divider resistance 180 across which a potential gradient appears due to potential source 182, such as a battery.

Representing the potential at grid 106 by $E_1$, the potential at grid 152 by $E_2$ and the voltage difference between points 164 and 166 by $E_0$, then $$E_0 \cong E_1 - E_2$$

Due to the logarithmic resistive networks 168 and 170, the potential difference between lines 172 and 174 thereby is proportional to log $E_1$ − log $E_2$ or $$\log \frac{E_1}{E_2}$$

instead of being proportional to $E_1 - E_2$. Since $E_1$ and $E_2$ are D. C. voltages whose magnitudes depend on the received radio energy pulses, $E_0$ may be recorded directly as a measure of their ratio $R_0$ mentioned above, which may be interpreted in terms of the angle of arrival. Thus $R_0$ is a function of the logarithm $$\frac{E_1}{E_2}$$

which is recorded continuously by recorder 176. A recorder suitable for use as recorder 176 is known as "Brown Electronik Strip Chart Recorder." The recorder may be directly calibrated, therefore, in terms of the ratio $R_0$ which can then be used for obtaining angle of arrival by means of a chart, such as shown in Fig. 4, or suitable mathematical computation, or the recorder may be directly calibrated in terms of the angle of arrival.

In the gating circuit 102, two monostable multivibrators 184 and 186 are used. In the monostable multivibrator 184, triode 188 is maintained normally conductive and triode 190 is maintained normally non-conductive. In the monostable multivibrator 186, triode 192 is maintained normally conductive and triode 194 is maintained normally non-conductive. The triode 196 is also normally conductive thereby maintaining a sufficiently negative potential in line 100 to bias grids 98 and 148 below cutoff so that triodes 96 and 146 are normally non-conductive. When a negative pulse 198 appears in line 200 and thereby through condenser 202 at grid 204, it causes triode 188 to be extinguished. When triode 188 is extinguished, the potential in line 206 leading from its anode rises thereby causing a rise in potential at grid 208 so as to make tube 190 conductive. Conduction in tube 190 causes a drop in potential in its anode line 210 which appears through condenser 212 at grid 204 thereby maintaining a bias below cutoff at grid 204. The condenser 212 immediately begins to discharge through resistances 214, 216 and that portion of resistance 218 determined by the setting of adjusting arm 220. When capacitor 212 has discharged to the grid base potential of triode 188, the triode 188 will again begin to conduct. When the triode 188 again starts to conduct, the potential in its anode line 206 drops causing a corresponding drop in line 222 and through capacitance 224 at grid 226 in the triode 192. This drop in potential at grid 226 makes triode 192 non-conductive. When triode 192 becomes non-conductive, the potential in its anode line 228 rises causing a corresponding rise through capacitance 230 at grid 232 so as to make triode 194 conductive. The resulting drop in potential in line 234 in the anode circuit of triode 194 appears through capacitances 236 at grid 238 so as to cause triode 196 to become non-conductive thereby resulting in a rise in potential in line 100. This rise in potential appears as leading edge 240 of the positive gating pulse 104. When triode 194 became conductive, the potential drop in its anode line 234 appeared through capacitor 242 at grid 226 so as to maintain triode 192 non-conductive. The capacitor 242 immediately begins to discharge through resistances 244, 246 and that portion of resistance 248 determined by the setting of adjusting arm 250. When the discharge of capacitor 242 causes a rise in potential at grid 226 to the grid base potential, triode 192 will again become conductive thereby extinguishing triode 194. The extinguishing of conduction in triode 194 causes a rise in potential in line 234 and thereby at grid 238 so that triode 196 becomes conductive and causes a drop in potential in line 100 appearing as the trailing edge 252 of gating pulse 104. It should be noted that the position in time of the leading edge 240 with respect to the negative trigger pulse 198 may be controlled by proper adjustment of the adjusting arm 220 on resistance 218. Also the position of the trailing edge 252 and thereby the duration of pulse 104 may be controlled by proper adjustment of adjusting arm 250 on resistance 248.

In the present embodiment, the negative trigger pulse 198 is produced by a synchronizing pulse timer 254 which may consist of a conventional variable frequency oscillator having a manual control 256 for varying the frequency of oscillation and a suitable pulse former for converting each oscillation to the pulse 198. Thus by proper adjustment on the manual control 256, the pulse 198 may be made to appear in line 200 in synchronism with each transmitted radio energy pulse from the transmitter used in the system and thereby provide synchronous timing for each gating pulse 104. The frequency at which the pulse timer 254 is synchronized with the transmitter may be recognized by inspecting the recorder 176 during adjustment of the manual control 256. The indication on recorder 176 will not be steady until the trigger pulse 198 rate is the same as the rate of radio energy pulses from the transmitter. The reason for this is that only at the synchronous frequency does a particular mode of propagation become isolated so as to produce an indication at recorder 176 of only the isolated mode.

Figure 2:
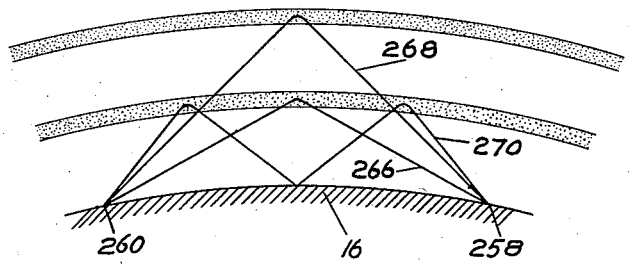
Fig. 2 is a view illustrating some representative paths of travel of radio energy waves from the transmitters to the receiving apparatus in the invention.

Referring to Fig. 2 wherein is shown an exemplary operating arrangement of the invention, a radio frequency transmitter 258 near the surface of the earth 16 is made to radiate radio energy pulses at a pulse rate preferably such that the resulting pulse train for each transmitted pulse appearing at receiver 260 (illustrated in Fig. 1) due to the various modes of propagation will not overlap succeeding transmitted pulses. A repetition period of .05 second was used in the present embodiment but other rates may be equally suitable. Thus, for example, the paths 266 and 270 determined by the E ionosphere layer and the path 268 determined by the F ionosphere layer are each of a different length and therefore will cause a pulse from transmitter 258 to appear at receiver 260 as a pulse train. The receiver 260, being of the type described in Fig. 1, has its synchronizing pulse timer 254 adjusted by the manual control 256 so as to produce negative trigger pulses 198 at the same rate as the pulses transmitted from transmitter 258. By further adjustment of adjusting arms 220 and 250 (Fig. 1), the gating pulse 104 may be adjusted so that a selected pulse or chain of pulses in the above train may thereby be singled out for angular information continuously recorded on recorder 156.

This invention is not limited to the particular details of construction and processes described, as many equivalents will suggest themselves to those skilled in the art. It is accordingly desired that the appended claims be given a broad interpretation commensurate with the scope of the invention within the art.

What is claimed is:

1. A system for measuring the angle of arrival at a receiving station of radio energy originating at a remotely located transmitting station, comprising: means at said transmitting station for generating and radiating a pulse of radio energy; directionally sensitive means at said receiving station for intercepting said pulse of radio energy and deriving therefrom pairs of composite signals, each signal constituting a combination of a portion of said pulse of radio energy reflected from the ionosphere and a portion thereof reflected from the earth; the signals of each pair of said composite signals differing from each other in amplitude as a function of the angles of arrival of those portions thereof reflected from the ionosphere; means receptive of said pairs of composite signals for deriving from each pair two additional signals corresponding, respectively, to the sum of and the difference between the amplitudes of the signals of each pair thereof; means at said receiving station, synchronized with the radiation of said pulse of radio energy, for isolating the aforementioned two additional signals derived from the pair of said composite signals corresponding to a selected mode of propagation of said pulse of radio energy; and means receptive of said last-named two additional signals for comparing the same to determine the ratio of the amplitudes thereof.

2. A system for measuring the angle of arrival at a receiving station of radio energy originating at a remotely located transmitting station, comprising: means at said transmitting station for generating and radiating a pulse of radio energy; directionally sensitive means at said receiving station, including a triple antenna array, for intercepting said pulse of radio energy and deriving therefrom pairs of composite signals, each signal constituting a combination of a portion of said pulse of radio energy reflected from the ionosphere and a portion thereof reflected from the earth; the signals of each pair of said composite signals differing from each other in amplitude as a function of the angles of arrival of those portions thereof reflected from the ionosphere; means receptive of said pairs of composite signals for deriving from each pair two additional signals corresponding, respectively, to the sum of and the difference between the amplitudes of the signals of each pair thereof; means at said receiving station, synchronized with the radiation of said pulse of radio energy, for isolating the aforementioned two additional signals derived from the pair of said composite signals corresponding to a selected mode of propagation of said pulse of radio energy; and means receptive of said last-named two additional signals for comparing the same to determine the ratio of the amplitudes thereof.

3. A system for measuring the angle of arrival at a receiving station of radio energy originating at a remotely located transmitting station, comprising: means at said transmitting station for generating and radiating a pulse of radio energy; directionally sensitive means at said receiving station for intercepting said pulse of radio energy and deriving therefrom pairs of composite signals, each signal constituting a combination of a portion of said pulse of radio energy reflected from the ionosphere and a portion thereof reflected from the earth; the signals of each pair of said composite signals differing from each other in amplitude as a function of the angles of arrival of those portions thereof reflected from the ionosphere; means receptive of said pairs of composite signals for deriving from each pair two additional signals corresponding, respectively, to the sum of and the difference between the amplitudes of the signals of each pair thereof; means receptive of said last-named two additional signals for comparing the same to determine the ratio of the amplitude thereof; and means at said receiving station, synchronized with the radiation of said pulse of said radio energy, for controlling the point of time and the duration of the period of response of said last-named means to isolate the aforementioned two additional signals derived from the pair of said composite signals corresponding to a selected mode of propagation of said pulse of radio energy.

4. A system for measuring the angle of arrival at a receiving station of radio energy originating at a remotely located transmitting station, comprising: means at said transmitting station for generating and radiating a pulse of radio energy; directionally sensitive means at said receiving station for intercepting said pulse of radio energy and deriving therefrom pairs of composite signals, each signal constituting a combination of a portion of said pulse of radio energy reflected from the ionosphere and a portion thereof reflected from the earth; the signals of each pair of said composite signals differing from each other in amplitude as a function of the angles of arrival of those portions thereof reflected from the ionosphere; means receptive of said pairs of composite signals for deriving from each pair two additional signals corresponding, respectively, to the sum of and the difference between the amplitudes of the signals of each pair thereof; means at said receiving station, synchronized with the radiation of said pulse of radio energy, for isolating the aforementioned two additional signals derived from the pair of said composite signals corresponding to a selected mode of propagation of said pulse of radio energy; and logarithmically-responsive means receptive of said last-named two additional signals for comparing the same to determine the ratio of the amplitudes thereof.

5. A system for measuring the angle of arrival at a receiving station of radio energy originating at a remotely located transmitting station, comprising: means at said transmitting station for generating and radiating a pulse of radio energy; directionally sensitive means at said receiving station, including a triple antenna array in a plane perpendicular to the earth, having the two outer antennas connected in parallel in one circuit and the center antenna connected in a second circuit, for intercepting said pulse of radio energy and deriving therefrom pairs of composite signals, each signal constituting a combination of a portion of said pulse of radio energy reflected from the ionosphere and a portion thereof reflected from the earth; the signals of each pair of said composite signals differing from each other in amplitude as a function of the angles of arrival of those portions thereof reflected from the ionosphere; means receptive of said pairs of composite signals for deriving from each pair two additional signals corresponding, respectively, to the sum of and the defference between the amplitudes of the signals of each pair thereof; means at said receiving station, synchronized with the radiation of said pulse of radio energy, for isolating the aforementioned two additional signals derived from a pair of said composite signals corresponding to a selected mode of propagation of said pulse of radio energy; and means receptive of said last-named two additional signals for comparing the same to determine the ratio of the amplitudes thereof.

6. A system for measuring the angle of arrival at a receiving station of radio energy originating at a remotely located transmitting station, comprising: means at said transmitting station for generating and radiating a pulse of radio energy; directionally sensitive means at said receiving station, including a triple antenna array in a plane perpendicular to the earth, having the two outer antennas connected in parallel in one circuit and the center antenna connected in a second circuit, for intercepting said pulse of radio energy and deriving therefrom pairs of composite signals, each signal constituting a combination of a portion of said pulse of radio energy reflected from the ionosphere and a portion thereof reflected from the earth; the signals of each pair of said composite signals differing from each other in amplitude as a function of the angles of arrival of those portions thereof reflected from the ionosphere; means receptive of said pairs of composite signals for deriving from each pair two additional signals corresponding, respectively, to the sum of and the difference between the amplitudes of the signals of each pair thereof; logarithmically-responsive means receptive of said last-named two additional signals for comparing the same to determine the ratio of the amplitudes thereof; and means at said receiving station, synchronized with the radiation of said pulse of radio energy, for controlling the point of time and the duration of the period of response of said last-named means to isolate the aforementioned two additional signals derived from the pair of said composite signals corresponding to a selected mode of propagation of said pulse of radio energy.

JOSEPH T. DE BETTENCOURT.

REFERENCES CITED

The following references are of record in the file of this patent:

UNITED STATES PATENTS

| Number | Name | Date |
|---|---|---|
| 1,435,941 | Robinson | Nov. 21, 1922 |
| 1,968,068 | Blancard et al. | July 31, 1934 |
| 2,059,315 | Chireix | Nov. 3, 1936 |
| 2,105,537 | Kramar | Jan. 18, 1938 |
| 2,223,995 | Kotowski et al. | Dec. 3, 1940 |
| 2,252,447 | Ulbright | Aug. 12, 1941 |
| 2,403,626 | Wolff et al. | July 9, 1946 |
| 2,423,523 | Schmurak et al. | July 8, 1947 |
| 2,456,666 | Agate et al. | Dec. 21, 1949 |
| 2,487,822 | McLamore et al. | Nov. 15, 1949 |
| 2,512,923 | Dippy | June 27, 1950 |